Oct. 13, 1970   J. H. KNAPTON ET AL   3,534,185
CONTROL DEVICE
Filed Oct. 25, 1968   2 Sheets-Sheet 1
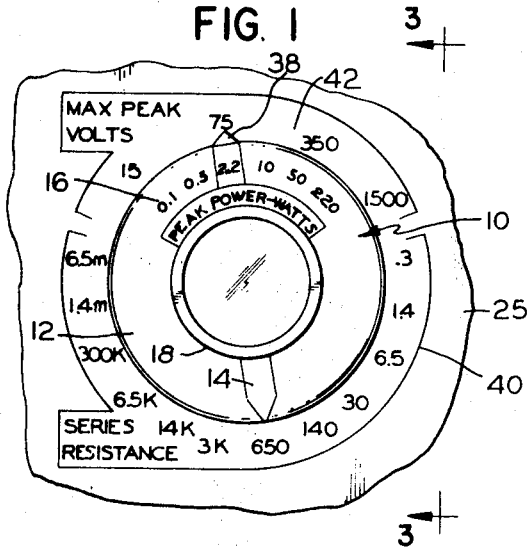
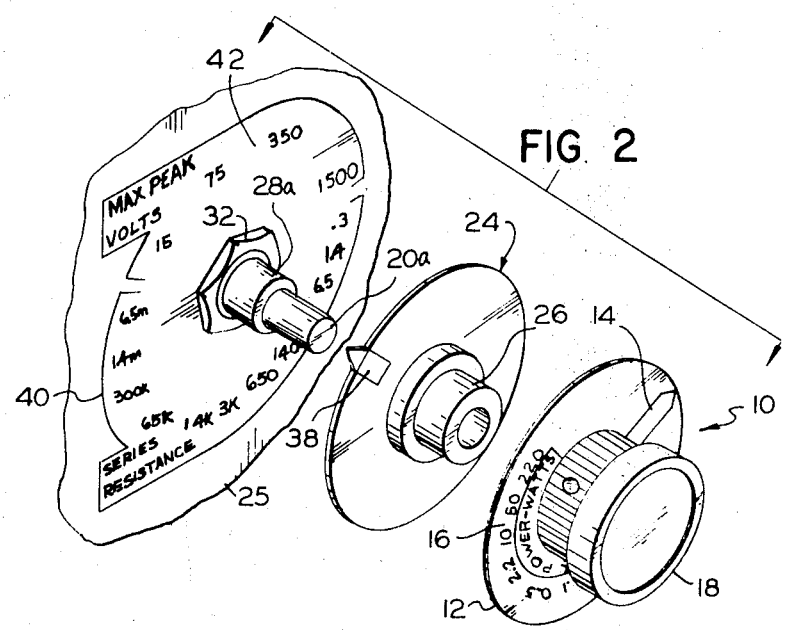
JAMES H. KNAPTON
SIDNEY H. BROUGHTON
JOSEPH L. LOEFFLER
INVENTORS.
BY
BUCKHORN, BLORE, KLARQUIST & SPARKMAN
ATTORNEYS

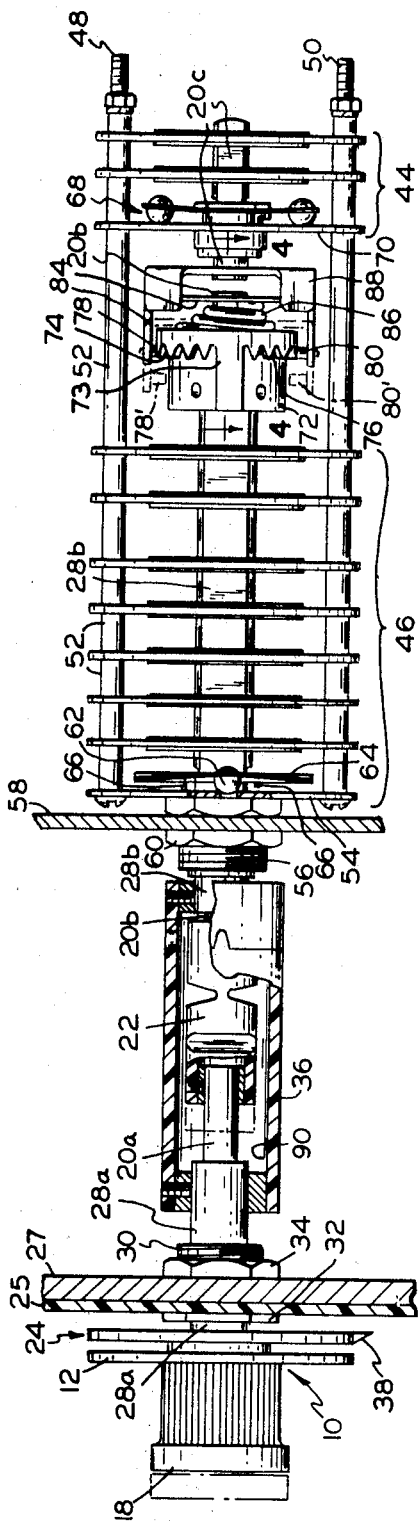

United States Patent Office 3,534,185
Patented Oct. 13, 1970

3,534,185
CONTROL DEVICE
James H. Knapton, Beaverton, Sidney H. Broughton, Portland, and Joseph L. Loeffler, Hillsboro, Oreg., assignors to Tektronix, Inc., Beaverton, Oreg., a corporation of Oregon
Filed Oct. 25, 1968, Ser. No. 770,500
Int. Cl. H01h 3/58
U.S. Cl. 200—18     13 Claims

ABSTRACT OF THE DISCLOSURE

A device for simultaneously adjusting plural interrelated electrical values includes first and second aligned rotary switch means operated by concentric shafts. These concentric shafts carry concentric dials adjacent the front panel of an instrument for indicating first and second electrical values controlled by the switch means. The dials are also provided with a relative scale for indicating the position of one switch means with respect to the other, thereby indicating a third electrical quantity which is a function of the first and second electrical values. Clutch means normally engage the concentric shafts for simultaneous rotation. However, the clutch means may be disengaged by axial movement of one of the dials for independent relative rotation of such dial and its associated switch means.

BACKGROUND OF THE INVENTION

In measuring instruments and the like, plural electrical values are frequently selected by means of front panel controls for establishing the operating conditions of a device under test. For example, in a curve tracer displaying the characteristic curves of a transistor upon the screen of a cathode ray tube, the voltages and resistances in the test circuit are selectable employing multiposition switches. Thus, a transistor's collector supply voltage and a series dissipation limiting resistance may be chosen for generating a characteristic curve or curves within the operating range of the transistor. When a wide range of supply voltage and resistance values are available, accidental selection of a combination exceeding the power rating of the transistor is readily possible. Therefore, the appropriate dissipation limiting resistance value for each voltage range must ordinarily be calculated beforehand, and change in selected values during operation of the instrument tends to be delayed or impeded.

SUMMARY OF THE INVENTION

According to the present invention, an improved control device simultaneously adjusts plural interrelated electrical values. First and second control means, for example rotary switches, have concentric operating shafts carrying concentric indicating dial means which register electrical values as selected by the control means. The first and second shafts are normally interconnected by an engaged clutch means for simultaneous rotation, whereby the electrical values are adjusted together, but may be disengaged for independent operation of one of the control means. The dial means are provided with a relative scale for indicating the relative position therebetween.

In a specific embodiment of the present invention, one of the aforementioned control means is employed for adjusting a dissipation limiting resistance, and the other control means is used for adjusting supply voltage. The operating shafts of the control means are normally clutched together by a detent mechanism whereby the dissipation limiting resistor for a transistor or the like is changed at the same time as the supply voltage is changed, in a manner for maintaining the maximum power substantially constant.

The clutch or detent mechanism is selectively disengaged by axial movement of the resistance selecting dial means, and this dial means may then be turned for changing the resistance independently, i.e., without changing the supply voltage. A relative scale is provided between the dial means for indicating maximum power to the load. Only intentional independent change of the dissipation limiting resistance will bring about a change in power, and then with full indication to the instrument operator of the power change. The power information is ordinarily much more useful to the operator than the resistance change alone.

In the present application and particularly the claims thereof, dial means is taken to mean a pointer cooperating with a stationary scale, a disc carrying a pointer cooperating with a stationary scale, a disc carrying a scale cooperble with the stationary pointer, or an equivalent device. The term dial may also be taken to include a knurled surface or knob for manually moving the dial when such movement is indicated.

It is accordingly an object of the present invention to provide an improved apparatus for simultaneously adjusting plural interrelated electrical values, while being able to selectively adjust one value with respect to the other for effecting change in a third electrical value.

It is another object of the present invention to provide an improved apparatus for selectively and simultaneously adjusting electrical values while providing an indication of such electrical values as well as a function of the relation therebetween.

It is another object of the present invention to provide an improved apparatus for simultaneously adjusting the supply voltage coupled to a load and resistance in series therewith and for alternatively adjusting the resistance alone to bring about an indicated change in power.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a front view of dial means according to the present invention;

FIG. 2 is an exploded perspective view of the dial means according to the present invention;

FIG. 3 is a side view, partially in cross section, of dial means and controlled switching means according to the present invention, as viewed from 3—3 in FIG. 3;

FIG. 4 is a detailed view, partially in cross section, taken at 4—4 in FIG. 3; and FIG. 5 is a schematic diagram illustrating operation of the present invention.

DETAILED DESCRIPTION

Referring to the drawings, and particularly to FIGS. 1 through 4, a first dial 10 comprises a transparent plastic disc 12 having a pointer 14 inscribed thereon. Diametrically opposite pointer 14 and around the edge of disc 12 is located a scale 16 comprising figures representing power in watts. Disc 12 is centrally secured to an operating knob 18, and the latter is in turn secured to an operating shaft 20a joined to an operating shaft extension 20b by means of flexible plastic coupling 22.

A second dial 24 is positioned just rearward of dial 10 between dial 10 and equipment panel 25 and subpanel 27. Dial 24 is suitably disc-shaped, having the same outside diameter as dial 10, and is centrally secured to a hub 26 for mounting upon shaft 28a concentrically disposed around shaft 20a, whereby dials 10 and 24 are also concentrically mounted. Shaft 28a is journaled within threaded coupling member 30, provided with a hex head 32 and a nut 34. Coupling member 30 is secured in matching apertures in panels 25 and 27. Shaft 28a is connected to extended outer shaft 28b through an outer flexible concentric coupling 38. It will be seen that flexible coupling 36 is longer than flexible coupling 22 providing an internal recess extension 90 long enough for permitting inward and outward axial movement of shaft 20a–20b together with flexible coupling 22. It will be noted that the coupling 36 transmits no significant torque, since no turning knob is connected to shaft 28a, but rather only dial 24 is connected thereto for indication alone in this specific instance.

Dial 24 is provided with a pointer 38 extending not only outwardly from the periphery of dial 24, but also toward hub 26 so the same can be seen behind transparent disc 12. As viewed in FIG. 1, panel 25 is provided with a lower resistance scale 40 disposed around the lower two-thirds of dial 10, and with which pointer 14 cooperates for indicating resistance values. Around the upper one-third of the concentric dials there is located a voltage scale 42 cooperable with pointer 38 of dial 24 for indicating maximum peak voltage. It will be observed the same pointer 38 is at the same time positioned adjacently behind a power value on scale 16, the pointer being clearly discernible through transparent disc 12.

Shaft extension 20b and shaft 28b are concentric inner and outer shafts for operating first and second control means or switching means 44 and 46 respectively. These switching means respectively comprise banks of conventional rotary switches joined together by means of long bolts 48 and 50 passing through apertures in the edges of the rotary switches, and through spacers 52. Front plate 54 of the combined switching means is provided with a threaded coupling 56 securing the switching means to mounting panel 58 by means of nut 60.

Switching means 46 includes a conventional detent mechanism comprising a ball 62 partially receivable within a plurality of apertures (not shown) in plate 54, the ball being urged against plate 54 by spring retainer 64. The detent mechanism includes stops 66 respectively located on plate 54 and extending from shaft 28b, so that the rotary motion of switching means 46 is limited to four detent positions. As may be seen from FIG. 1, these detent positions correspond to the four voltage values on scale 42. Switching means 44 also includes a ball and retainer arrangement 68, but front plate 70, comprising part of switching means 44, includes no apertures and therefore no separate detent positions are provided for switching means 44.

Shaft 28b operates switching means 46. Also a detent wheel 72 is mounted at the end of shaft 28b for rotation therewith. This detent wheel is provided with first and second sets of teeth 74 and 76 pointing forwardly and located at the rearward end of detent wheel 72. The sets of teeth engage transverse pins 78 and 80 mounted on side arms of frame 84. Pins 78 and 80 are directly opposite one another, and sets of teeth 74 and 76 are symmetrically identical, each providing nine dwell positions between stops 73 (only one of which is shown) into which pins 78 and 80 may fit. Frame 84 is mounted on the rearward end of shaft extension 20b, with spring 86 located between detent wheel 72 and the end of frame 84. Therefore, frame 84 is normally urged rearwardly whereby pins 78 and 80 normally engage teeth 74 and 76. However, shaft 20a–20b can be moved forwardly, as by grasping knob 18 and pulling the same to the left in FIG. 3, whereby the spring 86 is compressed and pins 78 and 80 are moved out of engagement with teeth 74 and 76.

When the pins 78 and 80 engage teeth 74 and 76, shaft 28a–28b turns with shaft 20a–20b. However, when knob 18 is pulled outwardly and held to compress spring 86 whereby pins 78 and 80 are positioned as indicated in dashed lines at 78' and 80', shaft 20a–20b can be turned without turning shaft 28a–28b.

A slidable coupling member 88 comprises a cover frame engaging both sides of frame 84 but leaving the latter free for longitudinal movement. Member 88 is joined to center shaft extension 20c comprising the operating shaft of switching means 44. As a result, center shaft 20c always turns with shaft 20a–20b regardless of the position of frame 84. The sliding coupling comprising members 84 and 88, pins 78 and 80, and detent wheel 72, together comprise a clutch means operable by axial movement of knob 18.

FIG. 5 is a simplified schematic diagram illustrating utilization of the present invention. A power transformer 92 has a primary winding 94 coupled through variac 96 to alternating current power input terminals 98 and 100. The transformer is also provided with a secondary winding 102 having a grounded center tap 104 and end taps connected respectively to terminals 106 and 110 of switching means 46a and 46b. Switch 46a is provided with a movable contact 108 for selectively making contact with one of the contacts 106, while switching means 46b includes a movable contact 112 for selectively connecting to one of the contacts 110. As indicated by the dashed line therebetween, movable contacts 108 and 112 are operable together, both forming part of switching means 46 as illustrated in FIG. 3, and both being concurrently movable for completing connections to selected transformer taps. I.e., when movable contact 108 is moved to a higher voltage position, further from grounded tap 104, then movable contact 112 likewise makes connection with a higher voltage tap further from grounded tap 104. Movable contacts 108 and 112 are respectively connected to the anode terminals of rectifiers 114 and 116, the cathode terminals of which are connected to the first end of resistors 118. A switching means 44, corresponding to the similarly numbered switching means in FIG. 3, selectively connects a resistance in series with a load 120.

In an advantageous application of the present invention, load 120 comprises a transistor under test in an apparatus for tracing characteristic curves of such transistor on the screen of a cathode ray tube. In a curve tracer instrument of this type, a number of collector voltage ranges are conveniently selected for the transistor, and a dissipation limiting resistor is selected for placing in series with the transistor collector. In prior instruments where the voltage value and the value of the dissipation limiting resistance are separately selectable, for example by means of front panel controls on an instrument, care must be taken not to increase the voltage to such a point that excessive power is delivered to the transistor. Each time, before the voltage is increased, the series dissipation limiting resistor value must be checked and frequently increased to the proper value such that excessive current is not supplied to the transistor. In accordance with the present invention, the dissipation resistance values are suitably changed automatically as the supply voltage range is changed whereby the dissipation rating is not exceeded. That is, both are increased together. Resistance values and resulting power can be changed independently, but only intentionally, while at the same time the increase in power dissipation is made readily apparent.

Referring to FIG. 5, collector voltage ranges are selected by operation of switching means 46, including the sections 46a and 46b thereof. Within a given range, the exact voltage is then selected with variac 96. The dissipation resistance is chosen by switch 44, but switch 44 is operated simultaneously with switch 46 as indicated by dashed line 122. Each time the voltage is changed by turning knob 18 in FIGS. 1 through 3, causing rotation of the ganged switching arrangement, the dissipation resistance is simultaneously increased to a value for maintaining the maximum power deliverable to the load at a substantially constant value. Switch 44 can be disengaged from switch 46 through axially forward movement of knob 18 whereby the clutch means comprising elements 72, 84 and 86 is disengaged. However, rotation of dial 10 with knob 18 provides not only an indication to the operator of the changed dissipation resistance, but also an indication that the maximum or peak power in watts is being changed at scale 16 as illustrated in FIGS. 1 and 2. The alteration of the series dissipation resistance value, in such a manner that the peak power dissipated is changed, cannot be accomplished at the same time the voltage range is adjusted, nor can the resistance be changed accidentally.

The illustrated voltage values on scale 42 and selected by switching means 46, each have a ratio of approximately 4.6:1 between adjacent positions. In the present construction, these positions are 36 degrees apart as determined by the detent means including elements 54, 62 and 64. The voltage range values are thereby selected on a logarithmic scale. The ratio of 4.6:1 is not exact in each case but is rounded off merely to provide round number ranges. Resistance scale 40 is also logarithmic and has adjacent resistance ratios of approximately 4.6:1, but 18 degrees apart. Likewise, the power scale 16 is logarithmic, wherein ratios between adjacent power values are approximately 4.6:1, and 18 degrees apart. The voltage positions are here illustrated as twice as far apart as the resistance positions and the power positions, as a consequence of the Ohm's law power formula:

$$P = \frac{E^2}{R}$$

The voltage squared term has twice as much effect on a logarithmic basis.

It would not be necessary to have the voltage positions twice as far apart if the voltage ratios were smaller, or the power and resistance ratios larger, but this particular arrangement has been found to be convenient in practice. The 4.6:1 ratios are not critical. Any desired ratio may be used as long as the ratios of resistance and power for a given spacing are the square of the voltage ratio for the same spacing.

An important factor to note is that scale 16, in cooperation with pointer 38, is effective for indicating the relative positions of dials 10 and 24, which in the present instance provides the indication of peak power in watts. This feature is advantageous wherever a relative quantity is desired.

In considering the specific values of voltage, resistance, and power depicted in FIGS. 1 and 2, it should be observed that the power values indicate peak power to the load, or power that is available to the device under test. This power is maximum when the test load is equal to the limiting resistance. The voltage across the load in such case would be half of the voltage value indicated upon scale 42. Thus, for the positions of the dials illustrated in FIG. 1, $$P = \frac{(75/2)^2}{650} = 2.17 \text{ watts}$$

The 2.2 dial reading provides a correct peak power within an intended accuracy.

In switching means 46 as illustrated in FIG. 3, rotation is limited to four detent positions, 36 degrees apart, for selecting the four voltage values of scale 42. Switching means 46 suitably comprises a plurality of rotary switches, some of which have functions not illustrated in the FIG. 5 simplified diagram. For example, some of the rotary switches are advantageously employed for reverse polarity connections and the like. The switching means 44 likewise may select more than one set of resistances 118. Switching means 44 does not employ a detent mechanism, but the contacts are aligned with the contacts of switching means 46 so that when both switching means are operated together, contacts and all switches will make substantially simultaneous connection. The sets of teeth 74 and 76 have dwell positions submultiply related to the detent positions of switching means 46, and switching means 44 in the described embodiment has twice as many switching positions as switching means 46. The sets of teeth 74 and 76 have dwell positions located such that when pins 78 and 80 are in a dwell position, the switching means 44 will make proper contact in one of its switching positions.

The stops 73, separating sets of teeth 74 and 76, prevent rotation of switching means 44 to locations where excessive power would be supplied the load, that is, wherein too small a resistance is selected for a given voltage, and likewise, for preventing selection of an unnecessarily large resistance. Thus, stops 73, which, of course, rotate with detent wheel 72 and shaft 28b, provide a range within which switching means 44 may be operated, for any given voltage position of switching means 46.

While the apparatus according to the present invention is particularly useful in this connection of simultaneous change of applied voltage and series dissipating resistance for normally maintaining power substantially constant unless a different power selection is desired, it is understood the apparatus is also applicable for selective simultaneous control of other electrical values, with the relative position of a pair of control means or switches being indicated for denoting a third electrical quantity, with such relative position being alterable to change the third electrical quantity. When a multiplicative relation is present between the original values, then the scales provided on the dial means are suitably logarithmic in nature.

We claim:

1. Apparatus for simultaneously adjusting plural interrelated electrical values comprising:

first and second concentric dial means including a first dial means for indicating and controlling a first electrical value, and second dial means rearward thereof for indicating and controlling a second electrical value, and means normally securing said dial means together in one of a number of different angular relationships for concurrent rotation but controllable for selectively disengaging said first dial means from said second dial means for rotation of said first dial means relative to said second dial means to select a different angular relationship, said dial means being securable in said different angular relationship for concurrent rotation, said dial means being provided with a relative scale indicating the relative position of said first and second dial means for indicating a third relative electrical value comprising a function of the first and second electrical values.

2. The apparatus according to claim 1 wherein said first and second dial means are provided with logarithmic scales indicating resistance and voltage respectively, and wherein the said relative scale comprises a logarithmic power scale.

3. The apparatus according to claim 1 wherein said first dial means is substantially transparent with said relative scale being inscribed thereupon, said second dial means including pointer means rearward of said first dial means for indicating the position of the second dial means while also registering in juxtaposition underneath said relative scale for indicating the position of the second dial means with respect to the first dial means.

4. Apparatus for simultaneously adjusting plural interrelated electrical values comprising:

first and second electrical control means adapted for adjusting first and second electrical values respectively comprising operating parameters of a given circuit, said first and second parameters defining therebetween a third relative function in said circuit, said first and second control means being provided with first and second concentrically disposed operating shafts, first and second concentric dial means rotatable with rotation of said first and second concentric shafts for indicating the positions of said first and second control means respectively, clutch means operated by axial movement of one of said shafts in response to axial movement of the corresponding dial means for selectively engaging said shafts for simultaneous rotation and for selectively disengaging said shafts, said clutch means being engageable for simultaneous rotation in a plurality of positions for providing plural selectable angular differences between said shafts, in each case determinative of a different selection of said third relative function, and a scale on a first of said dial means for indicating the rotational position of said first dial means and the corresponding control means relative to the other dial means and its corresponding control means, and for indicating thereby said third relative function of the first and second electrical values.

5. The apparatus according to claim 4 wherein said first and second electrical control means comprise first second multiposition rotary switches disposed in line and operable by said first and second operating shafts.

6. The apparatus according to claim 4 wherein
said first and second electrical control means comprise first and second multiposition rotary switch means rotatable to various positions by said first and second concentrically disposed operating shafts respectively, wherein said switches are positioned in line with the operating shafts extending axially thereof, and wherein said clutch means comprises a detent wheel located between said first and second switching means, which detent wheel is secured to a first of said shafts, said detent wheel having a plurality of detent teeth, and detent teeth engaging means rotatably secured to the second of said shafts wherein axial movement of the second of said shafts disengages said detent teeth engaging means from said detent wheel.

7. The apparatus according to claim 4 wherein said first and second electrical control means comprise first and second multiposition rotary switch means rotatable to various positions by said first and second concentrically disposed operating shafts respectively, wherein said switches are positioned in line with the operating shafts extending axially thereof, and wherein said clutch means comprises a detent wheel secured to a first of said shafts, said detent wheel having a plurality of detent teeth, and detent teeth engaging means rotatably secured to the second of said shafts wherein axial movement of the second of said shafts disengages said teeth engaging means from said detent wheel, said apparatus including a slidable coupling between said teeth engaging means and the second rotary switch means, and spring biasing means for normally establishing engagement between the teeth of said detent wheel and said teeth engaging means.

8. The apparatus according to claim 4 wherein said clutch means comprises a toothed detent wheel and tooth engaging means operated by said axial movement of said one of said shafts, said control means comprising rotatable multiposition switching means wherein the operating shaft of one of said switching means is secured to said detent wheel, with the same switching means having a detent mechanism with a plurality of detent positions having the same angular separation as selected dwells between teeth of said detent wheel.

9. The apparatus according to claim 4 wherein said first and second control means are connected to adjust resistance and voltage values respectively, said first and second dial means being provided with logarithmic scales indicating resistance and voltage respectively, and wherein the said scale on a first of said dial means for indicating relative position comprises a logarithmic power scale, said voltage scale having twice the separation between voltage values having a predetermined ratio such that the power scale indicates the quotient of $$\frac{(E/2)^2}{R}$$

for various settings wherein E is the voltage indicated by the second concentric dial means, and R is the resistance indicated by the first concentric dial means.

10. Apparatus for simultaneously adjusting plural electrical values comprising:

first and second aligned multiposition switching means for controlling first and second electrical quantities respectively in the same circuit, said switching means being provided with first and second concentrically disposed operating shafts, first and second concentric dial means located at one end of both said switching means and rotated in response to the rotation of said first and second concentric shafts respectively for indicating the positions of said first and second switching means, and clutch means operated by axial movement of one of said shafts in response to the axial movement of the corresponding dial means for selectivelyy engaging and disengaging said shafts for simultaneous rotation, said clutch means being located adjacent atleast one of said switching means, said clutch means including means for selectively interengaging said shafts in a plurality of different relative angular positions each for permitting simultaneous operation of said switching means between substantially simultaneously engageable switching positions, the relative angular difference indicating a third electrical quantity in said circuit determined by said first and second quantities.

11. The apparatus according to claim 10 wherein said clutch means comprises a detent wheel secured to one of said shafts and provided with a plurality of of teeth therearound, said clutch means further including teeth-engaging means rotatably secured to the other of said shafts and axially movable therewith for engagement and disengagement with the teeth of said detent wheel, and a slidable coupling means between said teeth engaging means and the switching means operated by the last mentioned shaft so the last mentioned shaft may move axially with respect to the last mentioned switching means.

12. The apparatus according to claim 10 including a coaxial flexible coupling between said dial means and said switching means, said flexible coupling comprising an inner flexible coupling and an outer flexible coupling provided with an internal recess for receiving said inner flexible coupling, the recess in said outer flexible coupling having an axial length sufficient for permitting axial movement of the inner flexible coupling with said axial movement of the said one of said shafts for operating said clutch means.

13. The apparatus according to claim 10 wherein
said clutch means comprises a dentent wheel secured to the outer of said shafts and provided with a plurality of teeth therearound, said clutch means further including teeth-engaging means rotatably secured to the inner of said shafts and axially movable therewith for engagement and disengagement with the teeth of said detent wheel, a slidable coupling means between said teeth-engaging means and the switching means operated by the inner shaft so that the inner shaft may move axially with respect to the last mentioned switching means, and spring means between the detent wheel and the teeth-engaging means normally forcing the two into engagement.

References Cited

UNITED STATES PATENTS

| | | | |
|---|---|---|---|
| 2,811,594 | 10/1957 | Papouschek | 200—14 |
| 2,816,183 | 12/1957 | Mangel | 200—14 |
| 3,164,798 | 1/1965 | Morgan | 200—11 XR |
| 3,187,118 | 6/1965 | Butler et al. | 200—5 |
| 3,207,861 | 9/1965 | White | 200—14 |
| 3,214,531 | 10/1965 | Dux | 200—14 |
| 3,287,512 | 11/1966 | Gertsch et al. | 200—17 |

ROBERT K. SCHAEFER, Primary Examiner

J. R. SCOTT, Assistant Examiner

U.S. Cl. X.R.

200—153

UNITED STATES PATENT OFFICE
CERTIFICATE OF CORRECTION

Patent No. 3,534,185      Dated October 13, 1970

Inventor(s)    JAMES H. KNAPTON et al

It is certified that error appears in the above-identified patent and that said Letters Patent are hereby corrected as shown below:

Col. 2, line 52, "Fig. 3" should be --Fig. 1--.

Col. 8, line 45, after "plurality", delete "of".
       line 66, "dentent" should be --detent--.

SIGNED AND SEALED

FEB 23 1971

(SEAL)
Attest:

Edward M. Fletcher, Jr.
Attesting Officer

WILLIAM E. SCHUYLER, JR.
Commissioner of Patents